(12) United States Patent
Huang

(10) Patent No.: US 10,712,793 B2
(45) Date of Patent: Jul. 14, 2020

(54) EXTERNAL DEVICE, ELECTRONIC DEVICE AND ELECTRONIC SYSTEM

(71) Applicant: ASUSTeK COMPUTER INC., Taipei (TW)

(72) Inventor: Hsin-Wu Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 218 days.

(21) Appl. No.: 15/376,685

(22) Filed: Dec. 13, 2016

(65) Prior Publication Data

US 2017/0177052 A1 Jun. 22, 2017

(30) Foreign Application Priority Data

Dec. 22, 2015 (CN) .......................... 2015 1 0968302

(51) Int. Cl.
*G06F 1/26* (2006.01)
*G06F 13/42* (2006.01)
(52) U.S. Cl.
CPC .............. *G06F 1/266* (2013.01); *G06F 1/263* (2013.01); *G06F 13/4282* (2013.01)
(58) Field of Classification Search
CPC ...... G06F 1/266; G06F 1/263; G06F 13/4282; G06F 1/16
USPC ............. 710/10, 22, 313, 316, 15, 305, 308; 713/320, 310; 711/115
See application file for complete search history.

(56) References Cited

U.S. PATENT DOCUMENTS

| | | | | |
|---|---|---|---|---|
| 7,222,211 B2* | 5/2007 | Lee | ....................... | G06F 13/387 710/315 |
| RE40,741 E * | 6/2009 | Simmonds | ............ | G06F 3/1438 345/502 |
| 7,865,628 B2* | 1/2011 | Konno | ................ | G06F 13/4221 710/10 |
| 7,925,812 B2* | 4/2011 | Konno | ................ | G06F 13/4068 439/628 |
| 7,975,091 B2* | 7/2011 | Uchida | ................... | G06F 1/266 307/43 |

(Continued)

FOREIGN PATENT DOCUMENTS

| CN | 201177778 | 1/2009 |
|---|---|---|
| CN | 202771313 | 3/2013 |

(Continued)

OTHER PUBLICATIONS

PCI Express Wikipedia (Year: 2003).*
"Office Action of China Counterpart Application," dated Apr. 1, 2019, p. 1-p. 13.

*Primary Examiner* — Aurel Prifti
(74) *Attorney, Agent, or Firm* — JCIPRNET

(57) ABSTRACT

An external device including at least a first connector, a signal transmission module and a power module is provided. The signal transmission module is electrically connected to the first connector. The power module is electrically connected to the first connector and outputs power via the first connector. The signal transmission module of the external device is a pluggable external graphics card. A graphics card or a graphics chip in the electronic device connected to the external device can be replaced via the external graphics card. Consequently, the graphics card or the graphics chip in the electronic device can be eliminated and thus the electronic device can be made light and thin.

20 Claims, 2 Drawing Sheets

(56) References Cited

U.S. PATENT DOCUMENTS

| | | | | |
|---|---|---|---|---|
| 8,055,844 B2* | 11/2011 | Lee | G06F 13/387 | 711/115 |
| 8,417,845 B2* | 4/2013 | Kim | G06F 13/385 | 710/22 |
| 8,706,944 B2* | 4/2014 | Song | G06F 13/387 | 710/313 |
| 8,977,797 B2* | 3/2015 | Chu | G06F 1/12 | 710/313 |
| 9,952,640 B2* | 4/2018 | Min | G06F 1/266 | |
| 2005/0138288 A1* | 6/2005 | Chou | G06F 13/409 | 711/115 |
| 2012/0017101 A1* | 1/2012 | So | G06F 1/266 | 713/300 |
| 2012/0059965 A1* | 3/2012 | Foster | G06F 1/12 | 710/305 |
| 2012/0324261 A1* | 12/2012 | Huang | G06F 1/3253 | 713/320 |
| 2013/0166928 A1* | 6/2013 | Yang | G06F 1/266 | 713/300 |
| 2013/0190059 A1* | 7/2013 | Song | H02J 7/027 | 455/573 |
| 2013/0191661 A1* | 7/2013 | Liu | G06F 1/26 | 713/310 |
| 2013/0246667 A1* | 9/2013 | Markel | G06F 13/4081 | 710/15 |
| 2013/0328613 A1* | 12/2013 | Kay | H03K 17/687 | 327/427 |
| 2014/0003451 A1* | 1/2014 | Wagh | H04L 41/0896 | 370/468 |
| 2014/0244869 A1* | 8/2014 | Adrian | G06F 13/385 | 710/106 |
| 2014/0281108 A1* | 9/2014 | Pethe | G06F 13/4027 | 710/313 |
| 2014/0306949 A1* | 10/2014 | Doyle | G06T 1/20 | 345/419 |
| 2015/0074323 A1* | 3/2015 | Chumbalkar | G06F 13/4022 | 710/316 |
| 2015/0234763 A1* | 8/2015 | Kline | G06F 13/4022 | 710/313 |
| 2015/0301964 A1* | 10/2015 | Brinicombe | G06F 13/28 | 710/308 |
| 2015/0316969 A1* | 11/2015 | Grunzke | G11C 5/147 | 713/310 |
| 2015/0378409 A1* | 12/2015 | Dunstan | G06F 13/385 | 713/310 |
| 2016/0055009 A1* | 2/2016 | Sakamoto | G06F 9/4411 | 710/14 |
| 2016/0062924 A1* | 3/2016 | Lee | G06F 13/102 | |
| 2016/0117793 A1* | 4/2016 | Sierra | G06T 1/20 | 345/502 |
| 2016/0231801 A1* | 8/2016 | Chandra | G06F 1/3212 | |
| 2016/0371218 A1* | 12/2016 | Roberts-Hoffman | G06F 12/0246 | |
| 2017/0068630 A1* | 3/2017 | Iskandar | G06F 13/4022 | |
| 2017/0116093 A1* | 4/2017 | Arroyo | G06F 11/2017 | |
| 2019/0102334 A1* | 4/2019 | Berchanskiy | G06F 3/14 | |

FOREIGN PATENT DOCUMENTS

| | | |
|---|---|---|
| CN | 104122940 | 10/2014 |
| TW | M338463 | 8/2008 |
| TW | 201331741 | 8/2013 |

\* cited by examiner

EXTERNAL DEVICE, ELECTRONIC DEVICE AND ELECTRONIC SYSTEM

CROSS-REFERENCE TO RELATED APPLICATION

This application claims the priority benefit of CN application serial No. 201510968302.2, filed on Dec. 22, 2015. The entirety of the above-mentioned patent application is hereby incorporated by reference herein and made a part of specification.

BACKGROUND OF THE INVENTION

Field of the Invention

The invention relates to an external device, an electronic device and an electronic system and, more particularly, to an electronic system including an external device and an electronic device which are connected to each other.

Description of the Related Art

Generally, a graphics card or a graphics chip of a notebook computer is configured at a mainboard of the notebook computer. However, with the configuration of the graphics card or the graphics chip on the mainboard, the size and the weight of the notebook computer are increased. The power consumption and heat are also increased when the notebook operates. Moreover, the size of a heat dissipation module should be increased to meet the heat dissipation requirement. However, it is not comply with the trend of light, small, and thin for electronic devices.

BRIEF SUMMARY OF THE INVENTION

According to first aspect of the disclosure, an external device is disclosed. The external device comprises at least a first connector; a signal transmission module, electrically connected to the first connector; and a power module, electrically connected to the first connector and outputting power via the first connector.

According to second aspect of the disclosure, an electronic device is disclosed. The electronic device comprises at least a second connector; a processing unit; and a multiplex unit, connected between the second connector and the processing unit, wherein when the multiplex unit switches to a first mode, the processing unit transmits a non USB signal via the second connector, and when the multiplex unit switches to a second mode, the processing unit transmits a USB 3.1 signal via the second connector.

According to third aspect of the disclosure, an electronic system is further disclosed. The electronic system comprises an external device and an electronic device. The external device includes at least a first connector, and a signal transmission module electrically connected the first connector. An electronic device includes at least a second connector, a processing unit, and a multiplex unit connected between the second connector and the processing unit, wherein when the first connector is connected to the second connector, the multiplex unit switches to a first mode, and the processing unit transmits a non USB signal via the second connector, and when the multiplex unit switches to a second mode, the processing unit transmits a USB 3.1 signal via the second connector.

DETAILED DESCRIPTION OF THE EMBODIMENTS

Figure 1:
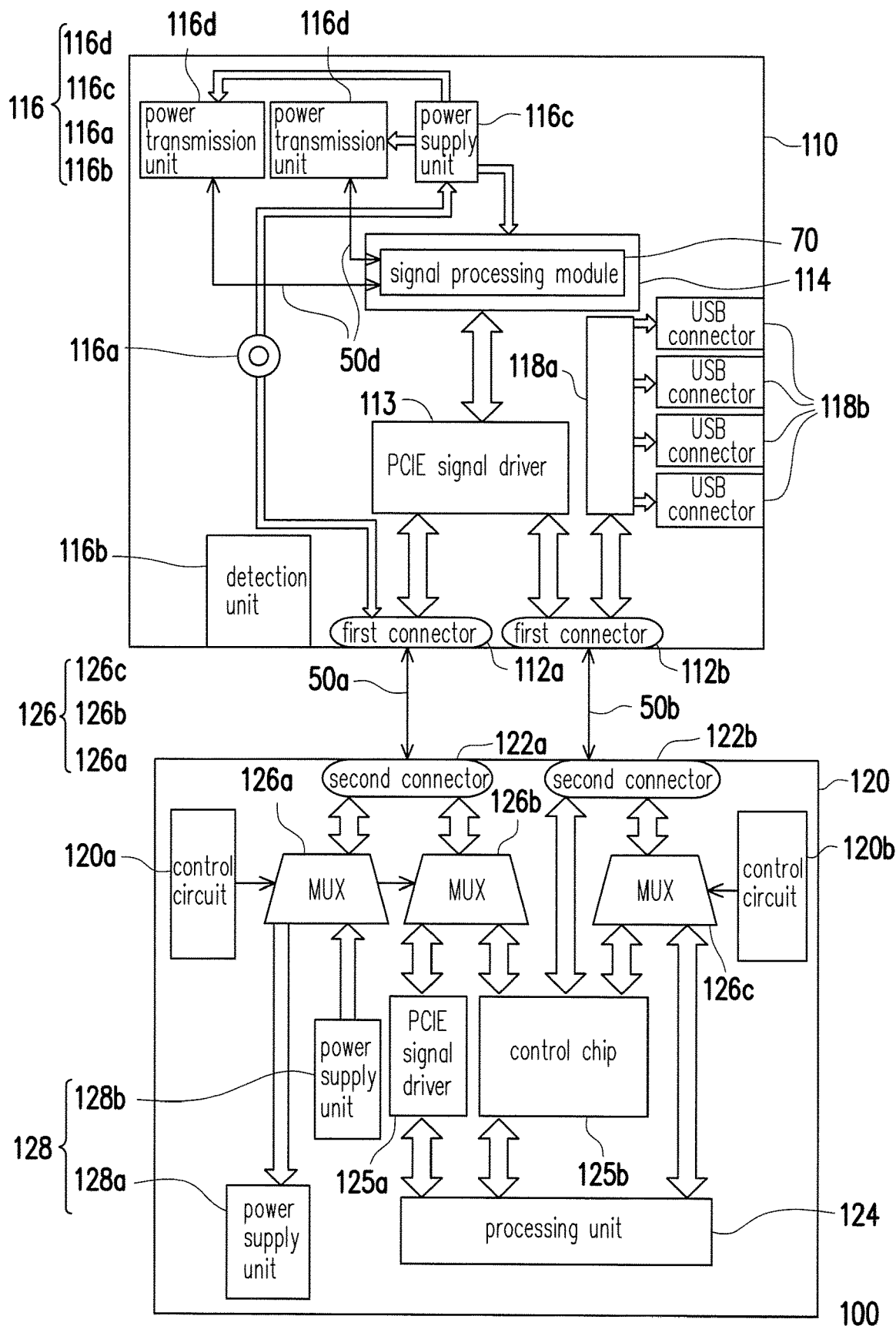
FIG. 1 is schematic diagram showing an electronic system in an embodiment.

FIG. 1 is schematic diagram showing an electronic system in an embodiment. Please refer to FIG. 1. In the embodiment, an electronic system 100 includes an external device 110 and an electronic device 120. The external device 110 is but not limited to an external graphics card device with at least a first connector (the first connectors 112a, 112b shown in FIG. 1) and a signal transmission module 114. The signal transmission module 114 is including a graphics card slot and electrically connected to the first connectors 112a, 112b. The signal transmission module 114 is adapted to transmit a non USB signal via the first connectors 112a, 112b. The non USB signal is such as a PCIE (Peripheral Component Interconnection Express) signal, which is not limited herein.

In the embodiment, the electronic device 120 is a notebook computer, and the electronic device 120 includes at least a second connector (the second connectors 122a, 122b shown in FIG. 1), a processing unit 124 and a multiplex unit 126. In an embodiment, the processing unit 124 includes a CPU (Central Processing Unit) and a corresponding PCH (Platform Controller Hub), which is not limited herein. The multiplex unit 126 is connected between the second connectors 122a, 122b and the processing unit 124.

As shown in FIG. 1, when the first connectors 112a, 112b of the external device 110 are connected to the second connectors 122a, 122b of the electronic device 120 via the transmission line 50a, 50b, respectively, the electronic device 120 detects the connection status and switches the multiplex unit 126 to a first mode via the control circuits 120a, 120b. Then, the processing unit 124 is adapted to transmit the non USB signal, such as the PCIE signal, to the external device 110 via the second connectors 112a, 112b.

In an embodiment, if the first connector 112a of the external device 110 is connected to the second connector 122a of the electronic device 120 via the transmission line 50a, and the first connector 112b of the external device 110 is not connected to the second connector 122b of the electronic device 120 via the transmission line 50b, the electronic device 120 switches the multiplex unit 126 to the first mode via the control circuit 120a. Then, the processing unit 124 is adapted to transmit the non USB signal, such as the PCIE signal, to the external device 110 via the second connector 112a.

Figure 2:
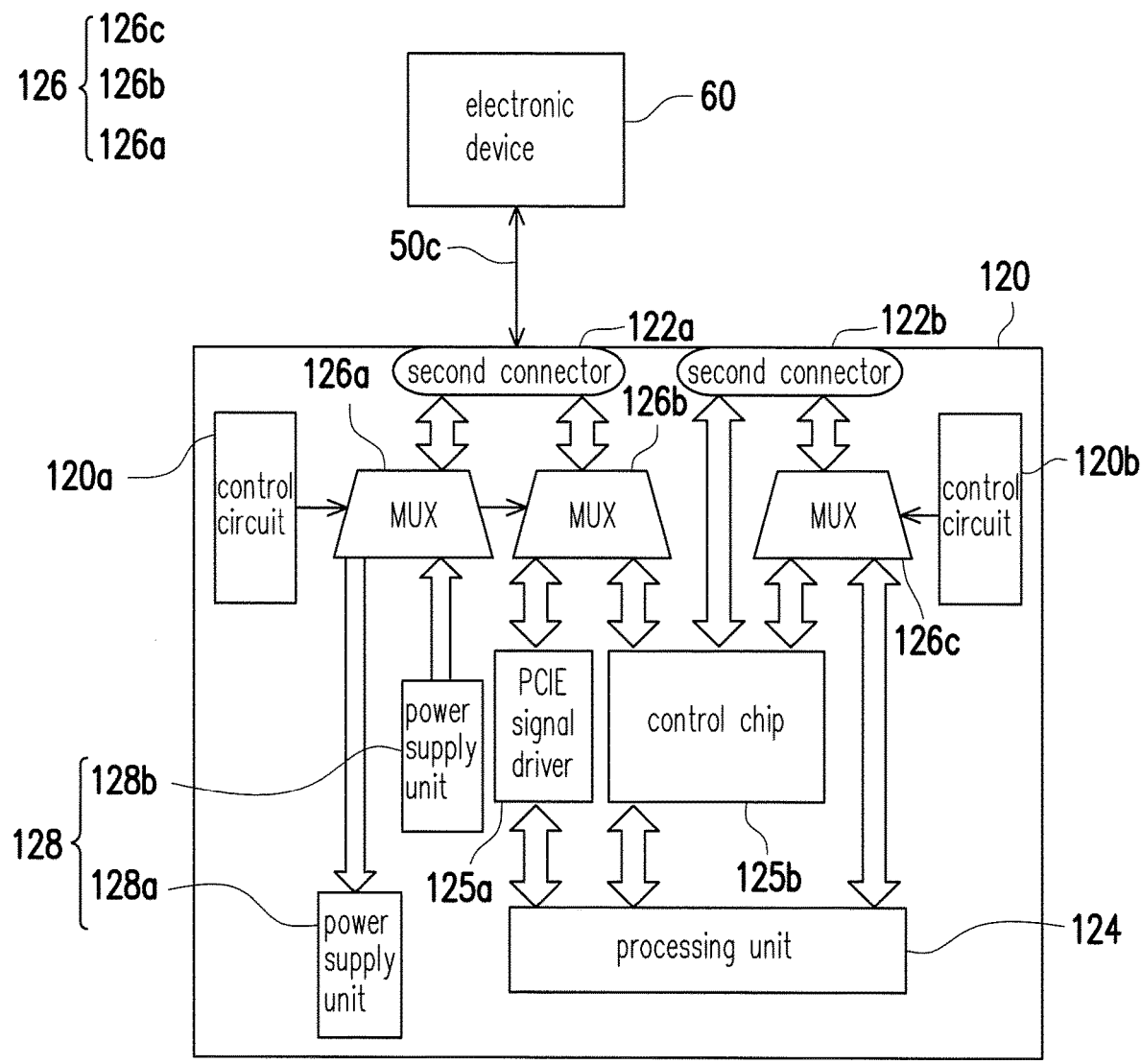
FIG. 2 is a schematic diagram showing the electronic device of FIG. 1 is connected to another electronic device.

FIG. 2 is a schematic diagram showing the electronic device of FIG. 1 is connected to another electronic device. In the embodiment, the electronic device 60 shown in FIG. 2 is adapted to transmit a USB 3.1 signal. For example, the electronic device 60 is a peripheral device adapted to the electronic device 120 or a portable device adapted to transmit data to the electronic device 120, which is not limited herein. As shown in FIG. 2, when the second connector 122a of the electronic device 120 is connected to the electronic device 60 via a transmission line 50c, the electronic device 120 detects the connection status and switches the multiplex unit 126 to a second mode via the control circuit 120a. Thus, the processing unit 124 is adapted to transmit the USB 3.1 signal to the electronic device 60 via the second connector 122a.

In the above configuration, a signal processing module 70 (such as a graphics card) plugged to the signal transmission module 114 can replace a graphics card or a graphics chip in the electronic device 120 when the electronic device 120 is connected to the external device 110. As a result, the graphics card or the graphics chip in the electronic device can be eliminated. The electronic device can be made light, small and thin. Moreover, the electronic device 120 switches the mode of the multiplex unit 126 to make the second connectors 122a, 122b have a function of transmitting both the USB 3.1 signal and the non USB signal (such as a PCIE signal).

In an embodiment, as shown in FIG. 1, a PCIE signal driver 125a is configured between the multiplex unit 126 and the processing unit 124. A PCIE signal driver 113 is configured between the first connectors 112a, 112b and the processing unit 124. Then, the PCIE signal transmitting between the external device 110 and the electronic device 120 can be adjusted in the connection status as shown in FIG. 1. Moreover, a control chip 125b is configured between the multiplex unit 126, and is in the connection status as shown in FIG. 2. The processing unit 124 converts the PCIE signal to the USB 3.1 signal, and then the USB 3.1 signal can be transmitted between the electronic device 120 and the electronic device 60.

In the embodiment, the first connector 112a of the external device 110 and the second connector 122a of the electronic device 120 are adapted to transmit both the non USB signal (such as PCIE signal) and power via the transmission line 50a, which is described in detail hereinafter.

In the embodiment, the external device 110 further includes a power module 116. The power supply end 116a of the power module 116 is electrically connected to the first connector 112a to receive external power. The power module 116 includes a detection unit 116b. When the detection unit 116b detects that the first connector 112a is electrically connected to electronic device 120 as shown in FIG. 1, the power module 116 outputs power to the electronic device 120 via the first connector 112a and the transmission line 50a.

Moreover, in the embodiment, the electronic device 120 includes a power module 128. The power module 128 includes power supply units 128a, 128b. The multiplex unit 126 is connected between the second connector 122a and the power module 128. When the multiplex unit 126 switches to the first mode according to the connecting status that the electronic device 120 and external device 110 are connected as shown in FIG. 1, the power supply unit 128a of the power module 128 receives the power from the external device 110 via the second connector 122a and the transmission line 50a and outputs the power to the electronic device 120. Moreover, when the multiplex unit 126 switches to the second mode according to the connecting status that the electronic device 120 and external device 60 are connected as shown in FIG. 2, the power supply unit 128b of the power module 128 outputs the power to the electronic device 60 via the second connector 122a and the transmission line 50c.

In the above configuration, the first connector 112a is used to transmit the PCIE signal between the external device 110 and the electronic device 120. Moreover, the first connector 112a also can be used to output the power from the external device 110 to the electronic device 120. Therefore, the electronic device 120 does not need the power line to receive the external power, which improves the convenience in use.

In the embodiment, the multiplex unit 126 of the electronic device 120 includes three multiplexers (MUX) 126a, 126b, and 126c. The multiplexer 126a is connected between the second connector 122a and the power module 128a to switch the first mode and the second mode between the second connector 122a and the power module 128a. The multiplexer 126b is connected between the second connector 122a and the processing unit 124 to switch the first mode and the second mode between the second connector 122a and the processing unit 124. The multiplexer 126c is connected between the second connector 122b and the processing unit 124 to switch the first mode and the second mode between the second connector 122b and the processing unit 124. The number of the multiplexer is various according to practical requirements, which is not limited herein.

The kinds of the first connectors 112a, 112b of the external device 110 and the second connectors 122a, 122b of the electronic device 120 are various and not limited herein. For example, the first connectors 112a, 112b and the second connectors 122a, 122b are USB Type-C connectors having the function of transmitting the USB 3.1 signal and the PCIE signal with high transmission rate and the function of transmitting the PCIE signal and power. The type of the first connectors 112a, 112b and the second connectors 122a, 122b are various, which is not limited herein.

The power module 116 of the external device 110 includes a power supply unit 116c. The power supply unit 116c is electrically connected to the signal transmission module 114 and adapted to supply a first power (such as 75 W) to the signal processing module 70 which is plugged to the signal transmission module 114. Moreover, the power module 116 further includes at least two power transmission units 116d. The power supply unit 116c is electronically connected to the two power transmission units 116d. When the signal processing module 70 plugged to the signal transmission module 114 is a graphics card which needs bigger power (such as 300 W), the signal processing module 70 is electronically connected to the transmission unit 116d via the two transmission lines 50d. Then, the power supply unit 116c is adapted to supply a second power (larger than the first power, such as 150 W) to the signal processing module 70 via the power transmission units 116d. Then, the signal processing module 70 operates at the needed power (such as 300 W).

Moreover, the external device 110 further includes a hub 118a and a plurality of USB connectors 118b. The hub 118a is electrically connected to the first connector 112b. In an embodiment, the USB connector 118b is a USB 2.0 connector electrically connected to the hub 118a. Consequently, when the first connector 112b of the external device 110 is connected to the second connector 122b of the electronic device 120 as shown in FIG. 1, the external device 110 is adapted to be used as an expansion interface of the electronic device 120 via the USB connectors 118b.

In sum, the signal transmission module of the external device in embodiments is a graphics card slot or a pluggable external graphics card. The conventional graphics card or the graphics chip in the electronic device connected to the external device can be thus replaced by the external graphics card. Consequently, the graphics card or the graphics chip in the electronic device can be eliminated and thus the electronic device can be made lighter and thinner. Moreover, the first connector is used to transmit the PCIE signal between the external device and the electronic device while it also can be used to output the power from the external device to the electronic device. Therefore, the electronic device receives the external power without the power line, which improves the convenience in use. Moreover, the second connector further transmits both USB 3.1 signal and non USB signal according to the mode of the multiplex unit of the electronic device.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An external graphics card device, comprising:
   at least one first connector;
   a signal transmission module, electrically connected to the at east one first connector; and
   a power module, electrically connected to the at least one first connector and outputting power via the at least one first connector,
   wherein the at least one first connector is adapted to transmit both a non universal serial bus (non USB) signal and power,
   wherein when the non USB signal is transmitted via the at least one first connector, the external graphics card device outputs the power via the at least one first connector,
   wherein when a USB 3.1 signal is transmitted via the at least one first connector, the external graphics card device receives the power via the at least one first connector.

2. The external graphics card device according to claim 1, wherein the signal transmission module transmits a peripheral component interconnection express (PCIE) signal via the at least one first connector.

3. The external graphics card device according to claim 1, wherein the power module includes a detection unit, when the detection unit detects that the at least one first connector is electrically connected to the electronic device, the power module outputs the power to the electronic device via the at least one first connector.

4. The external graphics card device according to claim 1, wherein the power module includes a power supply unit, the power supply unit is electrically connected to the signal transmission module, a signal processing module is plugged to the signal transmission module, and the power supply unit supplies a first power to the signal processing module.

5. The external graphics card device according to claim 4, wherein the power module further include at least two power transmission units, the power supply unit is electrically connected to the two power transmission units, when the signal processing module is electrically connected to the two power transmission units via the signal transmission module, the power supply unit is adapted to supply a second power to the signal transmission module via each of the power transmission units, and the second power is larger than the first power.

6. The external graphics card device according to claim 1, wherein the external device further includes a hub and a plurality of USB connectors, the at least one first connector includes two first connectors, the power module is electrically connected to one of the two first connectors, the hub is electrically connected to the other one of the two first connectors, and each of the USB connectors is electrically connected to the hub.

7. An electronic device, comprising:
   at least one second connector;
   a processing unit; and
   a multiplex unit, connected to the at least one second connector and the processing unit, wherein when the multiplex unit switches to a first mode, the processing unit transmits a non universal serial bus (non USB) signal via the at least one second connector, and when the multiplex unit switches to a second mode, the processing unit transmits a USB 3.1 signal via the at least one second connector,
   wherein the at least one second connector is adapted to transmit both the non USB signal and power,
   wherein when the non USB signal is transmitted via the at least one second connector, the electronic device receives the power via the at least one second connector,
   wherein when the USB 3.1 signal is transmitted via the at least one second connector, the electronic device outputs the power via the at least one second connector.

8. The electronic device according to claim 7, wherein when the multiplex unit switches to the first mode, the processing unit transmits a peripheral component interconnection express (PCIE) signal via the at least one second connector.

9. The electronic device according to claim 7, wherein the electronic device includes a power module, the multiplex unit is connected between the at least one second connector and the power module, when the multiplex unit switches to the first mode, the power module receives the power via the at least one second connector, and when the multiplex unit switches to the second mode, the power module outputs the power via the at least one second connector.

10. The electronic device according to claim 9, wherein the multiplex unit includes a plurality of multiplexers, one of the multiplexers is connected to the at least one second connector and the processing unit and the other one of the multiplexers is connected to the at least one second connector and the power module.

11. An electronic system, comprising:
    an external graphics card device, including:
      at least one first connector; and
      a signal transmission module, electrically connected the at least one first connector; and
    an electronic device, including:
      at least one second connector;
      a processing unit; and
      a multiplex unit, connected between the at least one second connector and the processing unit, wherein when the at least one first connector is connected to the at least one second connector, the multiplex unit switches to a first mode, and the processing unit transmits a non universal serial bus (non USB) signal via the at least one second connector, and when the multiplex unit switches to a second mode, the processing unit transmits a USB 3.1 signal via the at least one second connector,
    wherein the at least one first connector and the at least one second connector are adapted to transmit both the non USB signal and power,
    wherein the external graphics card device is coupled to the electronic device so as to replace an internal graphics chip of the electronic device.

12. The electronic system according to claim 11, wherein the signal transmission module transmits a peripheral component interconnection express (PCIE) signal via the at least one first connector.

13. The electronic system according to claim 11, wherein the external graphics card device further includes a power module that is electrically connected to the at least one first connector and outputting the power via the at least one first connector.

14. The electronic system according to claim 13, wherein the power module includes a detection unit, when the detection unit detects that the at least one first connector is electrically connected to the electronic device, the power module outputs the power to the electronic device via the at least one first connector.

15. The electronic system according to claim 13, wherein the power module includes a power supply unit, the power supply unit is electrically connected to the signal transmission module, the signal processing module is plugged to the signal transmission module, and the power supply unit supplies a first power to the signal processing module.

16. The electronic system according to claim 15, wherein the power module further includes at least two power transmission units, the power supply unit is electrically connected to the two power transmission units, when the signal processing module is electrically connected to the two power transmission units via the signal transmission module, the power supply unit is adapted to supply a second power to the signal transmission module via each of the power transmission units, and the second power is larger than the first power.

17. The electronic system according to claim 15, wherein the signal transmission module includes a graphics card slot, and the signal processing module is a graphics card.

18. The electronic system according to claim 13, wherein the external graphics card device further includes a hub and a plurality of USB connectors, the at least one first connector includes two first connectors, the power module is electrically connected to one of the two first connectors, the hub is electrically connected to the other one of the two first connectors, and each of the USB connectors is electrically connected to the hub.

19. The electronic system according to claim 12, wherein when the multiplex unit switches to the first mode, the processing unit transmits the PCIE signal via the at least one second connector.

20. The electronic system according to claim 11, wherein the electronic device includes a power module, the multiplex unit is connected between the at least one second connector and the power module, when the multiplex unit switches to the first mode, the power module receives the power via the at least one second connector, and when the multiplex unit switches to the second mode, the power module outputs the power via the at least one second connector.

* * * * *